United States Patent
Spriggs

(10) Patent No.: US 10,837,889 B2
(45) Date of Patent: Nov. 17, 2020

(54) APPARATUS AND METHOD FOR MEASURING PARTICLE SIZE DISTRIBUTION BY LIGHT SCATTERING

(75) Inventor: David Michael Spriggs, Malvern (GB)

(73) Assignee: Malvern Panalytical Limited, Malvern (GB)

(*) Notice: Subject to any disclaimer, the term of this patent is extended or adjusted under 35 U.S.C. 154(b) by 0 days.

(21) Appl. No.: 14/345,082

(22) PCT Filed: Sep. 11, 2012

(86) PCT No.: PCT/GB2012/052228
§ 371 (c)(1),
(2), (4) Date: Jan. 8, 2015

(87) PCT Pub. No.: WO2013/038159
PCT Pub. Date: Mar. 21, 2013

(65) Prior Publication Data
US 2015/0138551 A1    May 21, 2015

(30) Foreign Application Priority Data
May 10, 2012 (GB) .................................. 1208183.2

(51) Int. Cl.
*G01N 15/02* (2006.01)
*G01N 21/47* (2006.01)

(52) U.S. Cl.
CPC ..... *G01N 15/0205* (2013.01); *G01N 15/0211* (2013.01); *G01N 21/47* (2013.01); *G01N 2201/06113* (2013.01)

(58) Field of Classification Search
CPC ........... G01N 15/0205; G01N 15/0211; G01N 21/47; G01N 21/532; G01N 21/02
See application file for complete search history.

(56) References Cited

U.S. PATENT DOCUMENTS 4,167,335 A * 9/1979 Williams ........... G01N 15/0205
356/336
4,900,120 A * 2/1990 Caviglia et al. ............... 385/50
(Continued)

FOREIGN PATENT DOCUMENTS

GB    2262985    7/1993
GB    2340932    3/2000

OTHER PUBLICATIONS

Scott Ellis, "Conceptual Design Phase Stray Light Analysis of the MOBIE Imaging Spectrograph for TMT", 2010.*

*Primary Examiner* — Maurice C Smith
(74) *Attorney, Agent, or Firm* — Kristofer E. Elbing

(57) ABSTRACT

Apparatus (200) for measuring the particle-size distribution of a sample by light-scattering comprises a focusing optic (202) for producing a converging beam (203) generally along a propagation axis z. The apparatus comprises a mounting system which allows a dry sample cell (208A) and a wet sample cell (208B) to be mounted in the converging beam at different times and in respective planes which are mutually inclined so that in use of the apparatus respective positions (212, 214) at which transmitted light is focused for the two cells have a difference in displacement from the z axis that is less than for the case where the respective planes are substantially parallel. This allows use of a cheaper and less complex translation stage within the apparatus for mounting an optical detector for locating the two focus positions.

13 Claims, 3 Drawing Sheets

(56) References Cited

U.S. PATENT DOCUMENTS

| | | | |
|---|---|---|---|
| 6,061,131 A | 5/2000 | Igushi | |
| 6,407,812 B1 | 6/2002 | Kurozumi | |
| 6,643,390 B1 * | 11/2003 | Clark | G06K 9/00046 |
| | | | 356/71 |
| 7,693,372 B2 * | 4/2010 | Kaneko et al. | 385/39 |
| 2002/0036776 A1 | 2/2002 | Shimaoka | |
| 2003/0030802 A1 * | 2/2003 | Watson et al. | 356/336 |
| 2006/0016968 A1 | 1/2006 | Yoshioka | |
| 2006/0052944 A1 | 3/2006 | Nagura | |
| 2007/0165225 A1 * | 7/2007 | Trainer | 356/335 |
| 2008/0117413 A1 * | 5/2008 | Liphardt et al. | 356/73 |
| 2009/0002811 A1 * | 1/2009 | Uchiyama | G02B 21/241 |
| | | | 359/383 |

* cited by examiner

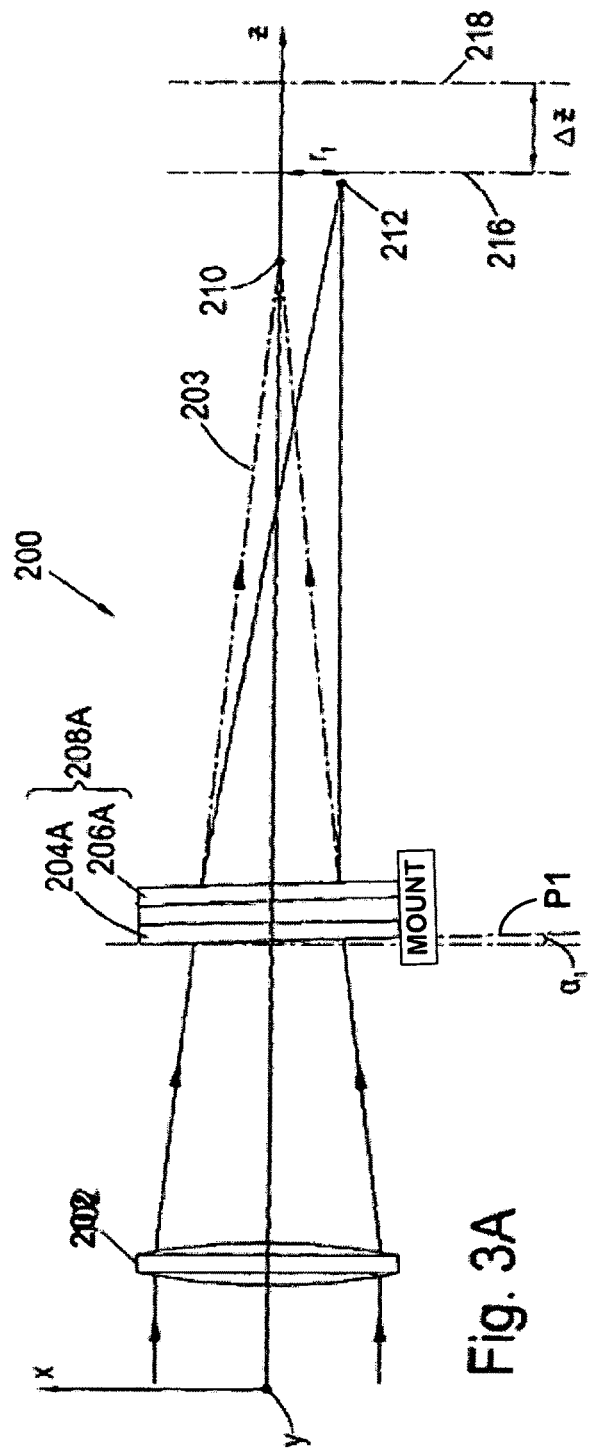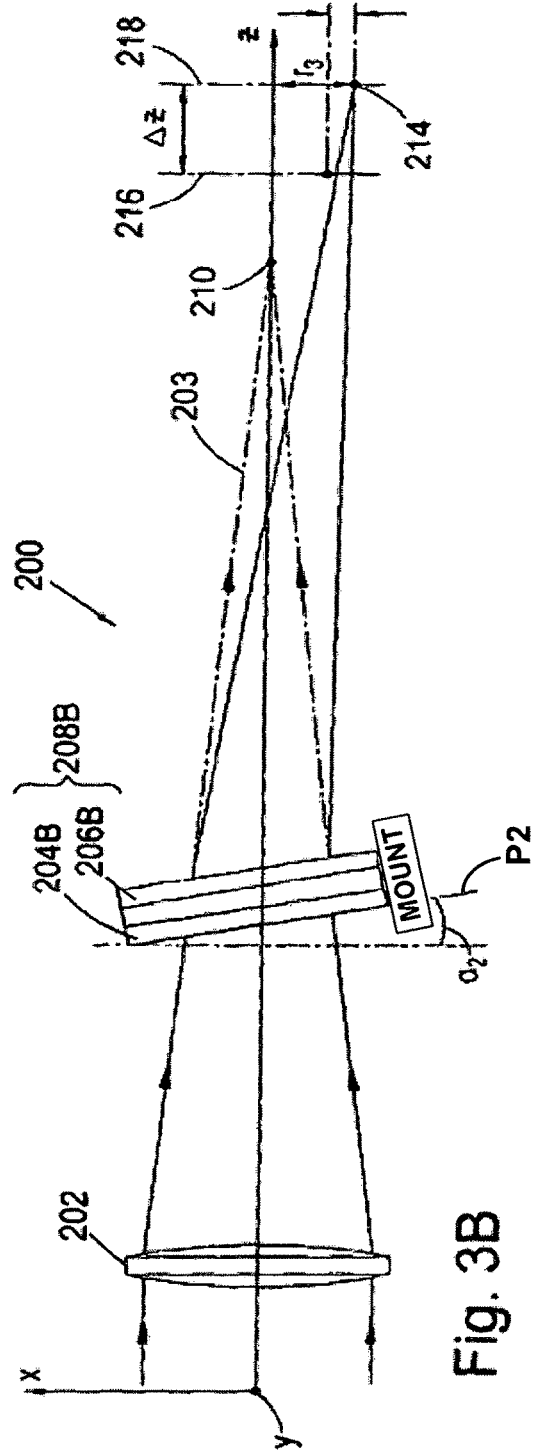

APPARATUS AND METHOD FOR MEASURING PARTICLE SIZE DISTRIBUTION BY LIGHT SCATTERING

The invention relates to apparatus and methods for measuring the particle-size distribution of a sample by light scattering.

Measurement of the particle-size distribution of a sample by detecting light scattered by the sample is known. The sample is placed within a sample cell, and light, typically from a laser, is directed into the cell after first passing though a focusing optic so that it converges as it passes into the sample cell. Light scattered by the sample cell is detected by one or more detectors each of which corresponds to a particular scattering angle with respect to the direction of the incident light. Light transmitted by the sample cell is also detected at the focus of the focusing optic and sample cell. The particle-size distribution of the sample may be determined by measuring the intensities of the light scattered and transmitted by the sample cell.

The sample within the sample cell may be dry (forming a dry sample cell), or alternatively in some cases it may be carried in a liquid so the sample cell contains a suspension of particles in the liquid (a wet sample cell). Particle-sizing instruments are generally required to be able to handle both dry and wet sample cells. In a wet or dry sample cell, the cells walls may be mutually inclined in order to prevent ghost reflections (i.e. secondary reflections resulting from multiple reflections at the surfaces of optical components) reaching the focal plane of a particle-sizing instrument. In other words the cell walls of a sample cell normally have a mutual wedge angle. The wedge angle causes an angular deviation of light on transmission through the sample cell, the angular deviation typically being greater for a wet sample cell than for a dry sample cell due to the presence of liquid within the wet sample cell. The lateral position of the focus therefore typically varies depending on whether a wet sample cell or a dry sample cell is used. Also, the longitudinal position of the focus of the focusing optic and sample cell varies depending on whether a wet or dry sample cell is used. In order to accommodate variations in the lateral and longitudinal positions of the focus that may arise when both wet and dry cells are used, a detector for measuring the intensity of transmitted light at the focus (and for locating the position of the focus) is normally mounted on an xyz translation stage. This adds considerably to the cost and complexity of a particle-sizing instrument. The greater the difference between the focus positions of wet and dry sample cell arrangements, the more costly and complex is the translation stage needed to accommodate the difference. Furthermore the variation in focus position between wet and dry sample cell arrangements increases as the focal length of the focusing optic decreases, so that compact particle-sizing instruments tend to be more expensive and complex. In other words there is trade-off off between the cost and complexity of a particle-sizing instrument, and its compactness.

A first aspect of the present invention provides apparatus for measuring particle-size distribution by light scattering, the apparatus comprising a focusing optic for producing for a converging beam of light directed generally along a propagation axis, and a mounting system for alternatively mounting a wet sample cell and a dry sample cell within the converging beam, wherein the mounting system is configured to mount the wet and dry sample cells in respective planes which are mutually inclined such that, in use of the apparatus, light is focused at respective positions when the wet and dry sample cells are used in the apparatus, said positions having a difference in displacement from the propagation axis which is less than said difference in the case where said planes are substantially parallel.

Since in use of apparatus of invention the difference in the respective displacements of the focus from the propagation axis when using a wet cell and dry cell respectively is reduced compared to that difference in the case where the two cells are substantially parallel, the pitch, in a plane perpendicular to the propagation axis, of a translation stage which carries a focal plane detector may be reduced compared to the (prior art) case where the two cells are mounted in planes which are substantially parallel. This allows use of cheaper and less complex translation stage.

Preferably, apparatus is configured such that the wet and dry sample cells may be mounted in the apparatus in respective planes which are mutually inclined at such an angle that the difference between the respective displacements of the focus from the propagation axis when the wet and dry sample cells are mounted in the apparatus is substantially zero, i.e. the focus positions have the same displacement transverse to the propagation axis.

In order to further reduce the specification of a translation stage comprised in the apparatus and mounting a focal point detector, preferably the optical path length through wet and dry sample cells to be used with the apparatus are substantially the same so that light is also focused at substantially a single plane transverse to the propagation axis in use of the apparatus.

A second aspect of the invention provides a method of measuring particle-size distribution for a sample comprising the steps of:
  (i) passing a beam of light through a focusing optic to produce a converging beam generally along a propagation axis; and
  (ii) mounting a dry sample cell and a wet sample cell in the converging beam at respective times;
  wherein the dry and wet sample cells are mounted in respective planes which are mutually inclined such that in use of the apparatus the light is focused at respective positions when the dry and wet sample cells are so mounted, said respective positions having a difference in displacement from the propagation axis which is less than said difference in the case where said respective planes are substantially parallel.

Embodiments of the invention are described below with reference to the accompanying drawings in which:

FIGS. 3A and 3B shows apparatus of the invention for determining the particle-size distribution of a sample by light-scattering.

Figure 1:
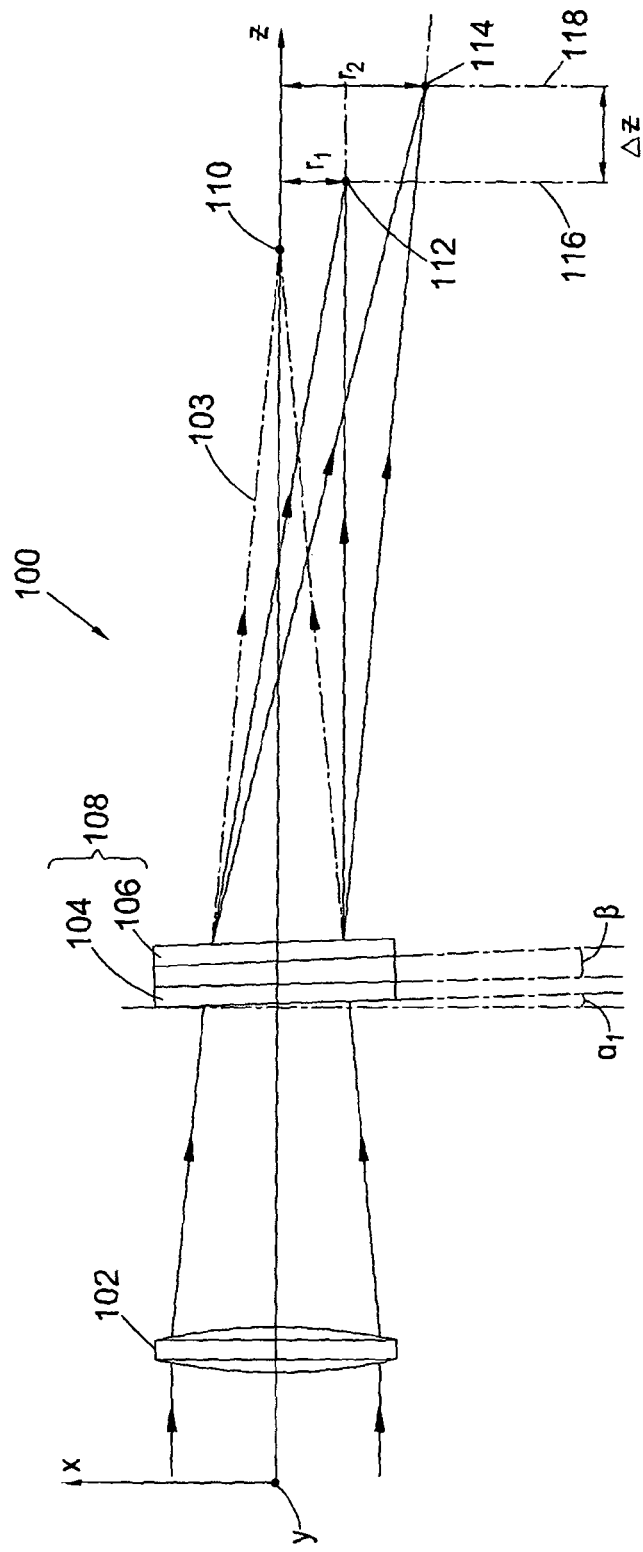
FIG. 1 shows part of an apparatus of the prior art for determining the particle-size distribution of a sample by light-scattering.
Figure 2A:
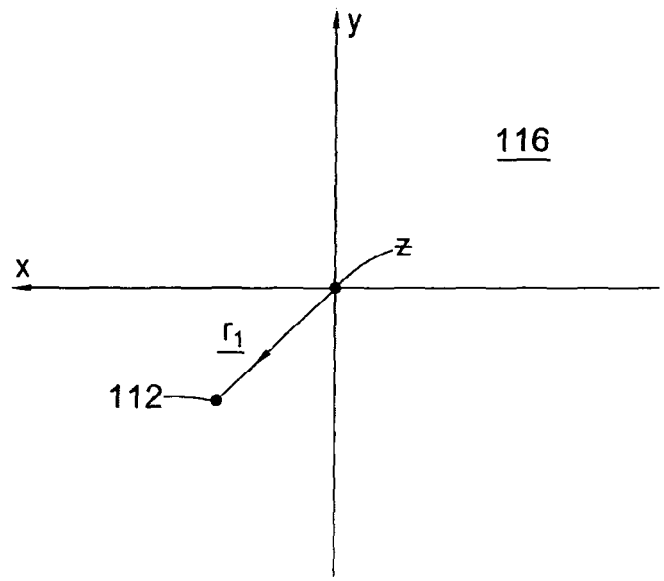
FIGS. 2A and 2B show the positions of a focus of transmitted light in the FIG. 1 apparatus when the apparatus is fitted with a dry sample cell and a wet sample cell respectively.
Figure 2B:
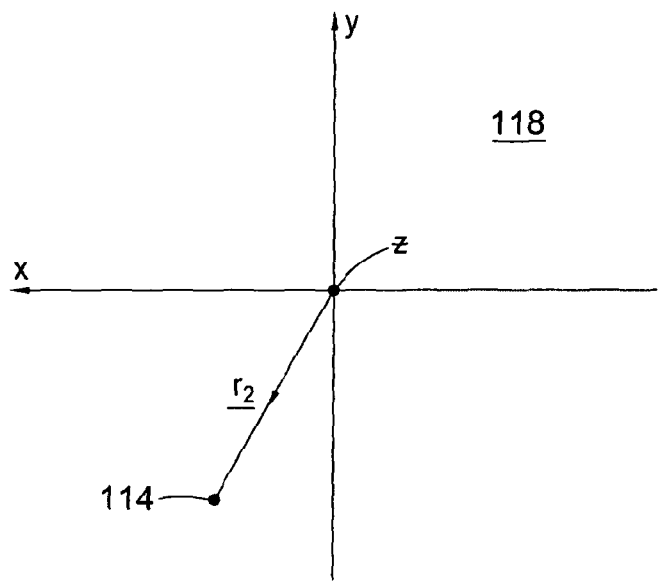

Referring FIGS. 1, 2A and 2B, a part 100 of an apparatus of the prior art for determining particle-size distribution by light-scattering comprises a focusing optic 102 arranged to receive light from laser (not shown) and to focus the light at a position 110 along a propagation axis z when the apparatus does not contain a sample cell. Light between the focusing optic 102 and the focus position 110 forms a converging beam 103. In use of the apparatus, a sample cell 108 containing a sample the particle-size distribution of which is to be measured is placed in the converging beam 103. The sample cell 108 comprises two cell walls 104, 106 extending in respective xy planes in FIG. 1 and having a mutual wedge angle β to prevent multiple reflections within the sample cell 108. Cell wall 104 is inclined at an angle α to the x axis in FIG. 1 to prevent reflection of light back towards the laser. In use of the apparatus, wet and dry sample cells are separately placed in the converging beam with the same orientation. If the sample cell 108 is a dry cell, the focus of the beam 103 is shifted to position 112 which is displaced by $r_1$ from the z (propagation) axis and which lies in an xy plane 116 which is further along the z axis than the xy plane in which position 110 lies. If the sample cell 108 is a wet cell, the focus is shifted to a position 114 which is displaced by a displacement $r_2$ from the z axis. Position 114 lies in an xy plane 118 which is further along the z axis than the xy plane 116 in which the position 112 lies, because the optical path length through a wet sample cell is typically greater than that through a dry sample cell. In order to allow both wet and dry sample cells to be used in the apparatus, a focal point detector (not shown) is mounted on an xyz translation stage (not shown) so that the detector may be moved between positions 112, 114.

FIGS. 3A and 3B show part 200 of an apparatus of the invention for measuring particle-size distribution by light-scattering. Parts in FIGS. 3A and 3B which correspond to parts in FIG. 1 are labelled with reference signs differing by 100 from those labelling the corresponding parts in FIG. 1. FIGS. 3A and 3B show the apparatus of the invention when provided with a dry sample cell 208A and a wet sample cell 208B respectively. The apparatus includes a mounting arrangement which allows a dry sample cell 208A or a wet sample cell 208B to be mounted in respective planes P1, P2 which are inclined at angles $\alpha_1$, $\alpha_2$ to the xy plane in FIGS. 3A and 3B respectively. Dry sample cell 208A has cell walls 204A, 206A which are mutually inclined at wedge angle β. Similarly, wet sample cell 208B has cell walls 204B, 206B which are mutually inclined at wedge angle β. The planes in which the dry cell 208A and the wet cell 208B may be held in the apparatus are thus mutually inclined at an angle $\alpha_2 - \alpha_1$. Since $\alpha_2 > \alpha_1$ the position 214 of the focus of the focusing optic 202 and the wet sample cell 208B is located closer to the z axis than would be the case if the wet sample cell 208B were to be mounted at the same inclination to the x axis as the dry sample cell 208A. The focus position 214 when the wet sample cell 208B is mounted in the apparatus is therefore closer to the focus position 212 when the dry sample cell 208A is mounted in the apparatus than would be the case if $\alpha_2 = \alpha_1$, reducing the xy movement required of a translation stage carrying a focal point detector comprised in the apparatus.

FIGS. 3A and 3B show that the focus position 214 of the focusing optic 202 and wet sample cell 208B lies in an xy plane 218 which is further along the z axis (propagation axis) than the xy plane 216 in which the focus position 212 of the focusing optic 202 and dry sample cell 208A lies. This is due to the greater optical path length through the wet sample cell 208B. In order to reduce the difference Δz in the z-positions of the planes 216, 218 the wet 208B and dry 208A sample cells may be constructed so that the difference in optical path lengths through the two cells is reduced. (For example the thicknesses of the cells walls 204A, 204B of the dry cell could be increased, or the thickness of the cell walls 204B, 206B of the wet cell 208B could be reduced.) This means that the z movement of a translation stage comprised in the apparatus, and mounting a focus detector, may be reduced, further simplifying the apparatus and reducing its cost. By making appropriate choices for the materials and thicknesses of the two cells, the optical path length difference may be substantially zero so that the two planes 216, 218 coincide. In this case a translation stage mounting a focus detector need not have any z movement, further simplifying the apparatus of the invention and further reducing its build cost.

The invention claimed is:

1. Apparatus for measuring particle-size distribution by light scattering in either a wet sample cell or a dry sample cell, the apparatus comprising:
   a source of light,
   a focusing optic for producing a converging beam of the light from the source directed generally along a propagation axis,
   a mount:
      that is constructed to mount the wet sample cell at a predetermined first angle of inclination within the converging beam,
      that is constructed to mount the dry sample cell at a predetermined second angle of inclination different from the first angle of inclination within the converging beam, and
      wherein the mount is constructed to mount the wet sample cell in a first plane and the mount is constructed to mount the dry sample cell in a second plane and wherein the first and second planes are mutually inclined with respect to each other,
   a scattering detector responsive to transmitted scattered light from the converging beam scattered by a sample in one of the wet and dry sample cells, and
   wherein the mount is constructed to cause a first optical path length of said converging beam of the light from the source through the wet sample cell mounted at the predetermined first angle of inclination to be substantially the same as a second optical path length of said converging beam of the light from the source through the dry sample cell mounted at the predetermined second angle of inclination such that, in use of the apparatus, transmitted scattered light from the source of light passing through the wet sample cell and transmitted scattered light from the source of light passing through the dry sample cell are both focused in substantially a single plane transverse to the propagation axis.

2. Apparatus according to claim 1, further comprising the wet sample cell and the dry sample cell, wherein a thickness of windows of the wet and dry sample cells are such that said optical path lengths are substantially equal.

3. Apparatus according to claim 1 wherein said respective planes are mutually inclined such that respective resulting focus positions for the wet and dry sample cells have substantially the same displacement along the propagation axis in a direction normal thereto.

4. Apparatus according to claim 1 wherein a thickness of windows of the wet and dry sample cells are such that said optical path lengths are substantially equal.

5. The apparatus of claim 1 wherein the source, the focusing optic, the mount, and the scattering detector are together constructed to define the predetermined first angle of inclination and the predetermined second angle of inclination to prevent secondary reflections resulting from multiple reflections at optical surfaces of the apparatus from reaching the single plane when particle-size distribution measurements are taken through the wet and dry sample cells.

6. A method of measuring particle-size distribution for a sample comprising the steps of:

(i) passing a beam of light through a focusing optic to produce a converging beam generally along a propagation axis;

(ii) mounting a dry sample cell and a wet sample cell in the converging beam at respective times; wherein the dry and wet sample cells are mounted in respective planes which are mutually inclined such that in use of the apparatus the light is focused at respective positions when the dry and wet sample cells are so mounted, said respective positions having a predetermined difference in displacement along the propagation axis;

(iii) detecting transmitted scattered light from the beam of light that has been scattered by the wet and dry samples; and wherein the respective optical path lengths through the dry and wet sample cells are substantially the same so that transmitted scattered light is focused in substantially a single plane transverse to the propagation axis.

7. A method according to claim 6 wherein said respective planes are mutually inclined such that said respective positions have substantially zero difference in displacement along the propagation axis.

8. A method according to claim 7 wherein the respective optical path lengths through the dry and wet sample cells are substantially the same so that light is focused in substantially a single plane transverse to the propagation axis.

9. Apparatus for measuring particle-size distribution by light scattering, the apparatus comprising:
an instrument including:
a source of light,
a focusing optic for producing a converging beam of the light from the source directed generally along a propagation axis,
a focal point detector, and
a wet sample cell for use in the instrument, comprising a first cell wall and a second cell wall, wherein the first and second cell walls of the wet sample cell are oriented at a first predetermined wedge angle,
a dry sample cell for use in the instrument, comprising a first cell wall and a second cell wall, wherein the first and second cell walls of the dry sample cell are oriented at a second predetermined wedge angle different from the first wedge angle, and
wherein the instrument is constructed to cause a first optical path length of said converging beam of the light from the source through the wet sample cell oriented at the first predetermined wedge angle to be substantially the same as a second optical path length of said converging beam of the light from the source through the dry sample cell oriented at the second predetermined wedge angle such that, in use of the apparatus, transmitted scattered light from the source of light passing through the wet sample cell are both focused in substantially a single plane transverse to the propagation axis.

10. Apparatus according to claim 9, wherein thicknesses of windows of the wet and dry sample cells are such that said optical path lengths are substantially equal.

11. The apparatus of claim 9 wherein the predetermined first wedge angle and the predetermined second wedge angle are selected to prevent secondary reflections resulting from multiple reflections at optical surfaces of the apparatus from reaching the single plane when particle-size distribution measurements are taken through the wet and dry sample cells.

12. Apparatus for measuring particle-size distribution by light scattering in either a wet sample cell or a dry sample cell, the apparatus comprising:
a source of light,
a focusing optic for producing a converging beam of the light from the source directed generally along a propagation axis,
a wet sample cell at a first predetermined angle of inclination within the converging beam during a wet sample measurement,
a dry sample cell at a second predetermined angle of inclination different from the first angle of inclination within the converging beam during a dry sample measurement,
wherein the wet and dry sample cells are mounted in respective planes which are mutually inclined with respect to each other,
a scattering detector responsive to transmitted scattered light from the converging beam scattered by a sample in one of the wet and dry sample cells, and
wherein a first optical path length of said converging beam of the light from the source through the wet sample cell oriented at the first predetermined angle of inclination is substantially the same as a second optical path length of said converging beam of the light from the source through the dry sample cell oriented at the second predetermined angle of inclination such that, in use of the apparatus, transmitted scattered light from the source of light passing through the wet sample cell and transmitted scattered light from the source of light passing through the dry sample cell are both focused in substantially a single plane transverse to the propagation axis.

13. The apparatus of claim 12 wherein the predetermined first angle of inclination and the predetermined second angle of inclination are selected to prevent secondary reflections resulting from multiple reflections at optical surfaces of the apparatus from reaching the single plane when particle-size distribution measurements are taken through the wet and dry sample cells.

* * * * *